United States Patent [19]

Tohyama et al.

[11] 3,843,259
[45] Oct. 22, 1974

[54] DIFFERENTIAL SPECTROPHOTOMETER
[75] Inventors: Shigeo Tohyama; Yoshio Sugiura, both of Katsuta, Japan
[73] Assignee: Hitachi, Ltd., Tokyo, Japan
[22] Filed: Dec. 7, 1973
[21] Appl. No.: 422,800

[30] Foreign Application Priority Data
Dec. 11, 1972 Japan.............................. 47-123334

[52] U.S. Cl..................................... 356/97, 356/95
[51] Int. Cl............................................... G01j 3/42
[58] Field of Search ................................ 356/93–97

[56] References Cited
UNITED STATES PATENTS
3,385,160  5/1968  Dawson et al. ...................... 356/96
3,723,008  3/1973  Fukuda et al. ..................... 356/96 X
3,737,234  6/1973  Shibata et al. ..................... 356/97 X OTHER PUBLICATIONS
Grum et al., "Derivative Absorption and Emission Spectrophotometry," Applied Optics, Vol. 11, No. 1, January 1972, pages 93–98.

Primary Examiner—John K. Corbin
Assistant Examiner—F. L. Evans
Attorney, Agent, or Firm—Craig & Antonelli

[57] ABSTRACT

A detected output signal of a detecting system of a spectrophotometer is applied as an input signal to a distributor in synchronism with an output of a pulse generator, and two output signals are delivered alternately from two output terminals respectively of the distributor in synchronism with the output of the pulse generator. These two output signals are applied to two memory circuits respectively, and the data (signals) stored respectively in the two memory circuits are subjected to subtraction. Alternate ones of the value obtained by subtraction of one of the signals from the other are applied to a polarity converter to appear as an output signal of the polarity converter.

10 Claims, 11 Drawing Figures

3,843,259

DIFFERENTIAL SPECTROPHOTOMETER

BACKGROUND OF THE INVENTION

1. Field of the Invention

This invention relates to spectrophotometers and more particularly to a spectrophotometer capable of obtaining a differentiated spectrum.

2. Description of the Prior Art

It is commonly well known that, when light is passed through a solution, a specific wavelength component of the light is solely absorbed by a specific component element in the solution. A peculiar component element in a solution absorbs a peculiar wavelength, and the rate of absorption has a fixed relationship with the concentration of the solution. A spectrophotometer utilizes the property above described and is an apparatus which determines component elements contained in a sample solution to be measured and measures quantitatively the concentration thereof. Therefore, the spectrophotometer has a construction as described below in order to determine an unknown component element contained in a sample solution. That is, on one hand, monochromatic light having a single wavelength is passed through the sample solution while at the same time scanning the above wavelength within a predetermined wavelength range and the rate of absorption of the light by the sample solution is detected by a detector to obtain a measured signal, while on the other hand, the same light as that above described is passed through a liquid such as distilled water and the light absorption rate is detected by the same detector so as to obtain a so-called reference signal which is to be compared with the measured signal. Then, the ratio between the measured signal and the reference signal, that is, the relative light absorption rate is converted into a signal and this signl is applied to a recorder for obtaining a spectrum representing the light absorption rate of the element for the specific wavelength without being adversely affected by variations of the light emitted from the light source. Of course, it is necessary in this case to drive the time axis of the recorder in proportion to the wavelength sweeping rate. The above description gives the outline of the basic principle of a spectrophotometer of the double beam type. In the absorption spectrum obtained in the manner above described, no problem arises when the peak of the spectrum relative to the wavelength can be clearly observed or determined. However, difficulty is encountered, for example, in the confirmation of absorption bands when two or more peaks in the spectrum overlap with slight wavelength differences, in the confirmation of a weak absorption hand overlapping the portion at which the absorption rate increases at an abrupt angle relative to the wavelength, and in the determination of the position of a broad peak in the spectrum. In such cases, it is difficult to confirm the absorption hands or peak positions by mere observation of the spectrum.

In a modern spectrophotometer proposed in an effort to eliminate the above problem, not only a spectrum representing the light absorption rate as above described is merely recorded, but also a differentiated spectrum of the first or second order obtained by differentiating the absorption spectrum is measured to compare the latter with the former for the purpose of attaining an accurate spectral analysis. At present, the measurement of the differentiated spectrum is an indispensable means in measurement by the spectrophotometer.

One of the typical methods for attaining measurement of a differentiated spectrum in prior art spectrophotometers comprises employing two spectroscopes, directing two light beams having slightly different wavelengths from the spectroscopes alternately toward a sample solution, and sweeping the wavelengths while maintaining constant the slight wavelength difference above described. Another typical method comprises equipping a spectroscope with means for very slightly varying the wavelength and seeking a very slight difference between the light absorption rates at these wavelengths.

As will be apparent from the basic principle of measurement of the differentiated spectrum by a spectrophotometer, the wavelength is scanned to seek the ratio of the minute difference between the light absorption rates $f(\lambda_1) - f(\lambda_2) = \Delta f(\lambda)$ to the minute difference between the wavelengths $\lambda_1 - \lambda_2 = \Delta\lambda$. Therefore, a special optical mechanism is required in order to obtain the minute wavelength difference $\Delta\lambda$ by optical means, and the spectrophotometer of this kind is defective in that it can be solely used for the measurement of the differentiated spectrum resulting in limitation of its application. Further, the apparatus of the kind using two spectroscopes is defective in that it can only measure the differentiated spectrum of the first order and cannot measure the differentiated spectrum of the second order which can be easily observed especially when confirmation of peaks of the absorption spectrum is desired. In contrast, a method for electrically obtaining the wavelength difference $\Delta\lambda$ by means such as an electronic computer comprises scanning the wavelength over the entire range, storing $\Delta f(\lambda)$ corresponding to $\Delta\lambda$ at the same time, computing these values and reading out the result of differentiation. According to this method, differentiation of higher order such as differentiation of the second order can be carried out in addition to differentiation of the first order. However, this method is substantially impractical in that a large-scale information processing unit is required resulting in the high cost of the overall apparatus.

SUMMARY OF THE INVENTION

It is an object of the present invention to provide a spectrophotometer capable of easily carrying out measurement of a differentiated spectrum by merely adding differentiating means to a prior art spectrophotometer, which has been incapable of such measurement, without modifying the optical system therein.

Another object of the present invention is to provide a spectrophotometer which includes inexpensive differentiating means for carrying out the measurement of the differentiated spectrum.

Still another object of the present invention is to provide a spectrophotometer which can carry out analysis of a spectrum within a short period of time with improved precision.

In a preferred embodiment of the spectrophotometer according to the present invention, light emitted from a light source is directed toward a dispersing element under rotation, the light reflected from the dispersing element is passed through a sample solution, and the light passed through the sample solution is detected by a detector to provide an output signal. The output signal of the detector is delivered in synchronism with an output of a pulse generator and is alternately distributed in synchronism with the output of the pulse generator to be stored in two memory circuits respectively, and the memories stored in the respective memory circuits are subtracted from each other.

Other objects, features and advantages of the present invention will be apparent from the following detailed description taken in conjunction with the accompanying drawing.

BRIEF DESCRIPTION OF THE DRAWING

FIG. 7b is spectral diagram showing differentiated spectra of the second order corresponding to the spectra shown in FIG. 7a.

DESCRIPTION OF THE PREFERRED EMBODIMENTS

Before describing the structure of a spectrophotometer embodying the present invention, the fundamental items concerning differentiating process will be described in detail.

Figure 1:
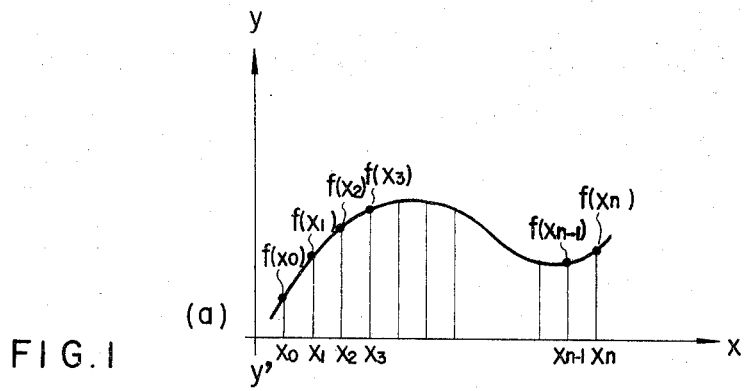
FIG. 1 shows the manner of differentiation.

The curve shown in FIG. 1a represents a continuous function $y = f(x)$, and the curve shown in FIG. 1b represents a first derivative of $y = f(x)$, ie. $y' = d/dx\, f(x)$. When now the $x =$ axis in the curve representing the continuous function $y = f(x)$ is divided into equally spaced minute sections and these points are designated by $x_0, x_1, x_2, x_3, \text{---} x_{n-1}, x_n$, the difference $\Delta x$ between each set of these points is given by $\Delta x = |x_1 - x_0|, |x_2 - x_1|, |x_3 - x_2| \text{---} |x_n - x_{n-1}|$. The corresponding difference $\Delta f(x)$ in the direction of the $y$ — axis is given by $\Delta f(x) = |f(x_1) - f(x_0)|, |f(x_2) - f(x_1)|, \text{---} |f(x_n) - f(x_{n-1})|$. Therefore, the result of the first differentiation of $y = f(x)$ can be expressed as $$y' = \frac{d}{dx}f(x) = \lim_{\Delta x \to 0} \frac{f(x_n) - f(x_{n-1})}{\Delta x}$$

and the curve shown in FIG. 1(a) is converted into the curve shown in FIG. 1(b). When this basic procedure of differentiation is applied to an output signal $f(x)$ (vertical axis) of a spectrophotometer, a relation as shown in FIGS. 2(a) and 2(b) can be obtained. More precisely, when the horizontal axis represents the wavelength $\lambda$ and this wavelength $\lambda$ is varied in a pulse-like fashion at constant intervals $\Delta\lambda$, corresponding pulse-like variations occur in the output signal $f(x)$ of the spectrophotometer. Therefore, on the basis of the first differentiation above described, the ratio of the difference between the adjoining pulse-like varying output signal portions $f(\lambda)$, that is, $\Delta f(\lambda)$ to the wavelength difference $\Delta\lambda$ may be sought to seek a differentiated spectrum in the spectrophotometer. The relation above described can be expressed as $$\frac{d}{dx}f(\lambda) = \lim_{\Delta\lambda \to 0} \frac{\Delta f(\lambda)}{\Delta\lambda}.$$

Figure 3:
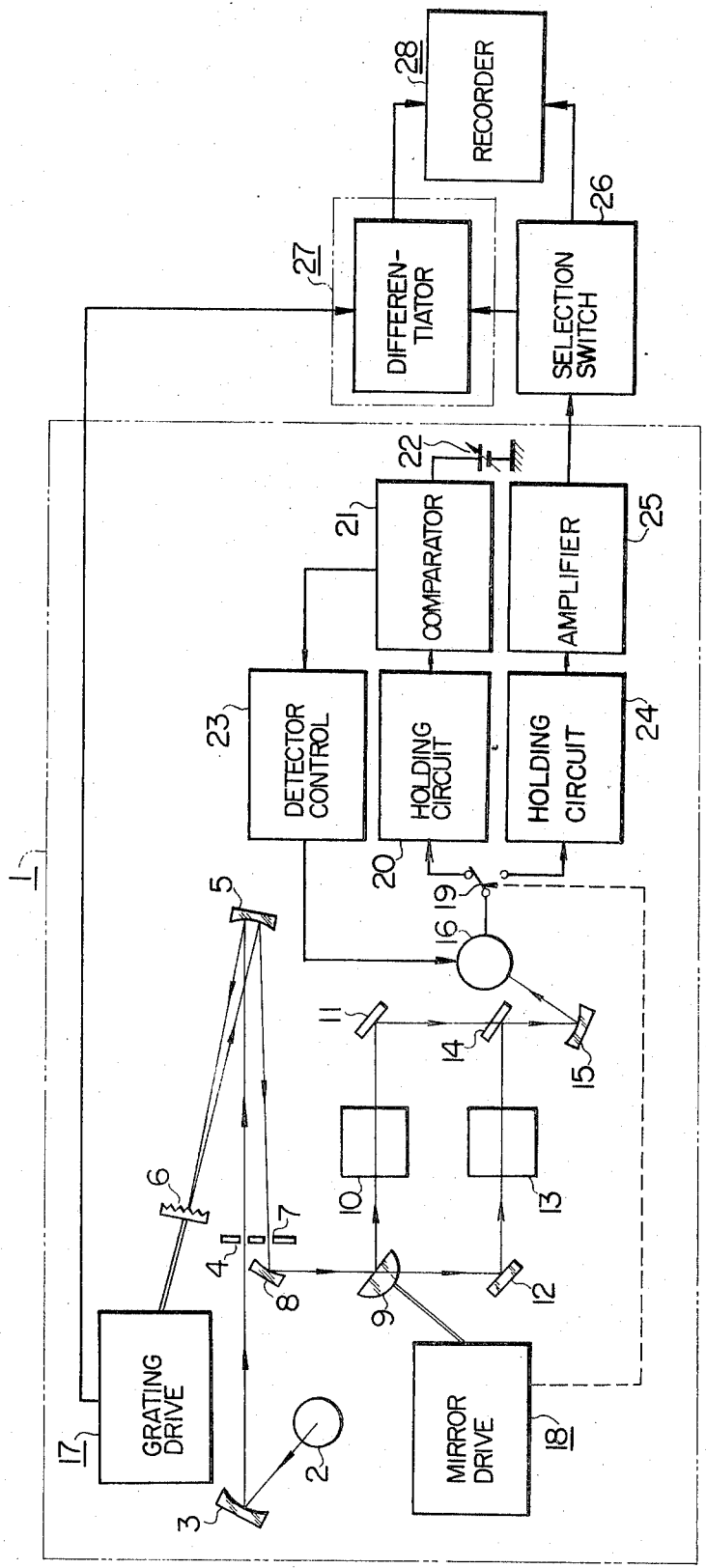
FIG. 3 is a block diagram showing the structure of an embodiment of the spectrophotometer according to the present invention.

FIG. 3 shows the basic structure of an embodiment of the present invention in which a simple differentiating circuit is incorporated in a spectrophotometer. The spectrophotometer shown in FIG. 3 is one form of the double beam type which is most commonly known in this field.

Referring to FIG. 3, the reference numeral 1 designates generally the portions of the spectrophotometer for deriving a detected signal. Light emitted from a light source 2 which may be a lamp is reflected by a mirror 3 to be directed through an entrance slit 4 toward a collimator mirror 5. The mirror 3 is in the form of a concave mirror so that the light beams reflected thereby can be concentrated on the entrance slit 4. Therefore, although the light beams passed through the entrance slit 4 diverge again, the light beams reflected by the collimator mirror 5 are rendered parallel. The parallel light beams leaving the collimator mirror 5 are directed toward a dispersing element which may be a diffraction grating 6, and the parallel light beams reflected by the diffraction grating 6 are directed toward the collimator mirror 5 again. The diffraction grating 6 has a function such that various wavelengths included in the parallel light beams incident thereupon are separated from one another depending on the angle of reflection of the parallel light beams. Therefore, the wavelength of the light beams reflected by the diffraction grating 6 and then by the collimator mirror 5 to pass through an exit slit 7 is determined by the angle with which the light beams are reflected by the diffraction grating 6. Generally, the wavelength is scanned within a predetermined range when a spectrum is obtained by a spectrophotometer. In a spectrophotometer, therefore, a diffraction grating is rotated for wavelength scanning on the basis of the spectroscopic principle of the diffraction grating. In FIG. 3 too, the diffraction grating 6 is rotated for the purpose of wavelength scanning by a drive means 17. The light of single wavelength leaving the exit slit 7 is reflected further by a concave mirror 8 to be directed toward a rotating mirror 9. This rotating mirror 9 is adapted to be rotated at a predetermined speed by a drive means 18 and is constructed so as to alternately direct the monochromatic light along two optical paths as shown in FIG. 3. More precisely, one portion of the monochromatic light reflected by the rotating mirror 9 is directed along an optical path including a reference solution 10, a plane mirror 11 and a half mirror 14, while the other portion of the monochromatic light is directed along another optical path including a plane mirror 12, a sample solution 13 and the half mirror 14. The light directed alternately along these two optical paths is reflected by a condenser mirror 16 and the reflected light is detected by a detector 16 to be converted into an electrical signal.

Due to the arrangement of the optical system above described, the reference signal obtained as a result of detection by the detector 16 of the light beam passed through the reference solution 10 and the measured signal obtained as a result of detection by the detector 16 of the light beam passed through the sample solution 13 and absorbed thereby appear alternately at the output of the detector 16. The reference signal and the measured signal are separately applied to a reference signal holding circuit 20 and a measured signal holding circuit 24 respectively by a switch 19 which is changed over at a speed equal to the period of rotation of the rotating mirror driving means 18. In other words, when the light beam passes through the reference solution 10, the signal obtained as a result of detection of the light beam by the detector 16 is applied through the reference signal holding circuit 20 to a comparator 21 to be compared with the output of a reference power source 22, and the output of the comparator 21 is applied through an applied voltage control circuit 23 to the detector 16 to control the voltage applied to the detector 16. Therefore, when the switch 19 is changed over to be connected to the measured signal holding circuit 24 and the light beam passed through the sample solution 13 is detected by the detector 16, the measured signal held in the measured signal holding circuit 24 is proportional to the rate of absorption of the light beam by the sample solution 13, due to the fact that the detector 16 is maintained in the same state as that in which the reference signal is detected.

The measured signal held in the holding circuit 24 is amplified by an amplifier 25, and then applied to the switching circuit 26 which is mentioned later.

The basic structure of the spectrophotometer proper will be understood from the above description. Generally, the measured signal above described has been applied to a recorder 28 for obtaining a spectrum representing, for example, the light absorption rate or applied to an electronic computer for obtaining a differentiated spectrum. In the present invention, the measured signal is applied to a switching circuit 26 as shown in FIG. 3. The measured signal is applied to the recorder 28 directly, or to a differentiating circuit 27 for obtaining a differentiated spectrum, or to both the recorder 28 and the differentiating circuit 27 by the switching circuit 26 which is externally manually actuated for selective application of the signal. The measured signal applied through the switching circuit 26 to the differentiating circuit 27 is actually a pulse-like signal in the form of a continuous train of pulses appearing at intervals of a minute wavelength difference. $\Delta\lambda$ as seen in FIG. 2(a). The measured signal has such a waveform because the diffraction grating 6 shown in FIG. 3 is rotated in the pulsating fashion by the diffraction grating drive means 17. (The present embodiment represents the case in which a pulse motor is used as the diffraction grating drive means 17.) The synchronizing signal generated by the pulse motor is applied to the differentiating circuit 27 for the differentiation of the measured signal.

Figure 4:
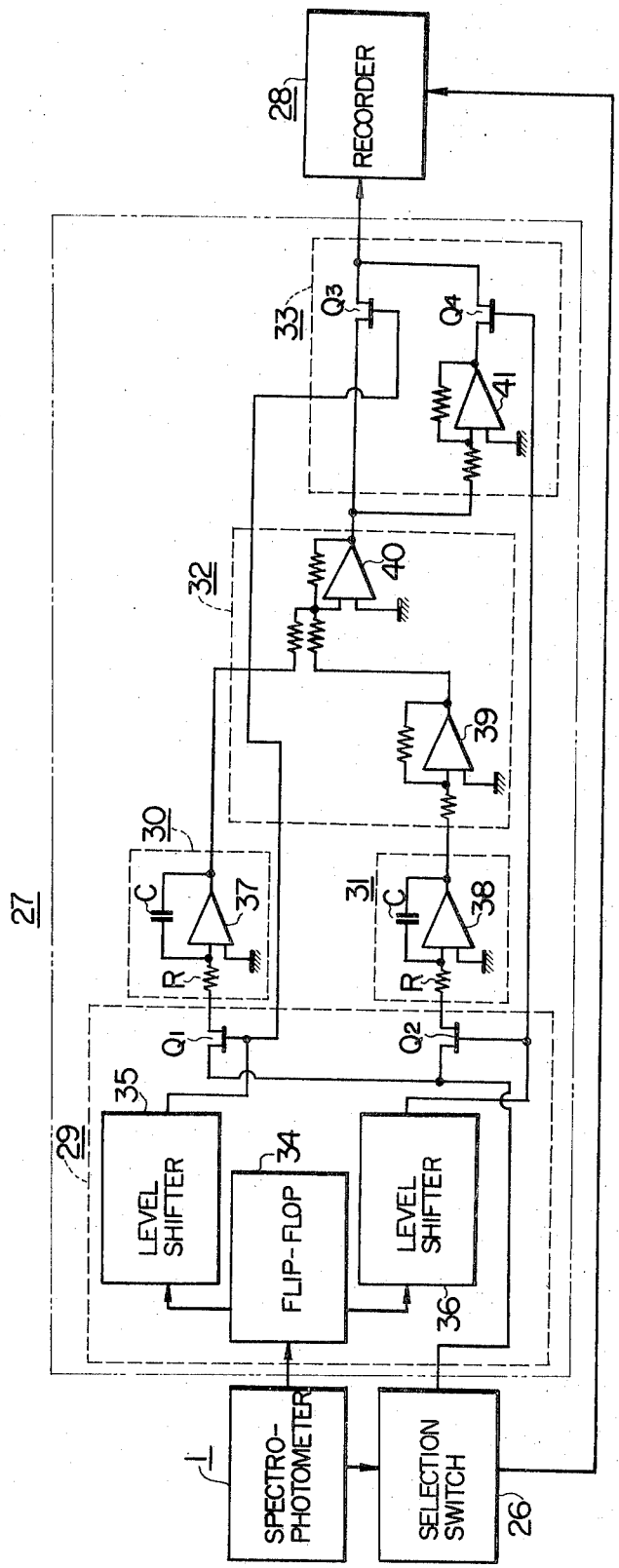
FIG. 4 is a circuit diagram showing in detail the structure of the differentiating circuit shown in FIG. 3.

In FIG. 4, the spectrophotometer 1 in FIG. 3 is shown by a simplified block form and the structure of one form of the differentiating circuit 27 is shown in detail. This differentiating circuit 27 will be described in detail with reference to FIG. 4.

Referring to FIG. 4, a distributor 29 is composed of a flip-flop 34, a pair of level shifters 35, 36 and a pair of field effect transistors $Q_1$, $Q_2$ and acts to distribute the measured signal to a pair of memory circuit 30 and 31 with a period synchronous with the synchronizing signal generated by the pulse motor. The memory circuits 30 and 31 are composed of resistors R, capacitors C and operational amplifiers 37, 38 respectively and store the measured signal distributed by the distributor 29. The two measured signals stored in the respective memory circuits 30 and 31 are applied to a subtracting circuit 32 so that one of the signals is subtracted from the other. This subtracting circuit 32 is composed of an operational amplifier 39 for converting the polarity of one of the input siganls and another operational amplifier 40 for deriving the differential voltage of the two signals. The output signal of the subtracting circuit 32 is applied to a polarity converting circuit 33. This polarity converting circuit 33 is composed of an operational amplifier 41 and a pair of field effect transistors $Q_3$, $Q_4$ and acts to convert the polarity of alternate pulses of the pulse-like measured signal for the reason described later.

The differentiating circuit 27 is composed of simple circuit elements having various functions as above described. The process in which the measured signal applied to the differentiating circuit 27 is differentiated by the differentiating circuit 27 to be applied to the recorder 28 will be described with reference to FIG. 4.

The pulse signal synchronous with the synchronizing signal of, for example, the pulse motor is applied from the spectrophotometer 1 to the flip-flop 34 in the differentiating circuit 27. In response to the application of the pulse signal, an output appears from the flip-flop 34, and the gates of the two level shifters 35 and 36 are alternately opened with the period synchronous with the pulse signal. Thus, the level-shifted voltages are alternately applied to the gate of the two field effect transistors $Q_1$ and $Q_2$. Since these field effect transistors $Q_1$ and $Q_2$ have a switching function, the measured signal applied from the spectrophotometer 1 through the switching circuit 26 is alternately applied to and stored in the two memory circuits 30 and 31 by the switching action of the field effect transistors $Q_1$ and $Q_2$. For the subtraction of one of the stored measured signals from the other, the output of the memory circuit 31, for example, is subjected to polarity conversion by the polarity converting operational amplifier 39, and the polarityconverted output of the operational amplifier 39 and the output of the memory circuit 30 are added to each other in the operational amplifier 40 to obtain the difference signal at the output of the operational amplifier 40. Such arrangement is based on the principle described with reference to FIGS. 1 and 2.

Suppose, for example, that an odd-numbered pulse in the pulse-like measured signal is stored in the memory circuit 30, then an even-numbered pulse is stored in the memory circuit 31. When now the wavelength is successively changed to $\lambda_1, \lambda_2, \lambda_3, \lambda_4, \lambda_5, \lambda_6, ---$ by the minute wavelength $\Delta\lambda$ due to the rotation of the pulse motor, $f(\lambda_1), f(\lambda_3), f(\lambda_5)$ among the corresponding pulses are successively stored in the memory circuit 30, while $f(\lambda_2), f(\lambda_4), f(\lambda_6)$ are successively stored in the memory circuit 31. Due to the fact that the pulse stored in the memory circuit 31 is subtracted from the pulse stored in the memory circuit 30 in each subtracting operation, the difference therebetween is given by $f(\lambda_1) - f(\lambda_2)$, $f(\lambda_3) - f(\lambda_2), f(\lambda_3) - f(\lambda_4), f(\lambda_5) - f(\lambda_4), ---$. However, the first and third results of subtraction $f(\lambda_1), -f(\lambda_2)$ and $f(\lambda_3) - f(\lambda_4)$ have a polarity opposite to that of the second and fourth results of subtraction $f(\lambda_3) - f(\lambda_2)$ and $f(\lambda_5) - f(\lambda_4)$ although the quantity of the signal obtained by subtraction is equal to the difference between the adjacent pulses shown in FIG. 2(a). In the differentiating circuit 27 shown in FIG. 4, therefore, the operational amplifier 41 in the polarity converting circuit 33 converts the polarity of the even-numbered results of subtraction, and the switching means or two field effect transistors $Q_3$ and $Q_4$ are operated in synchronism with the operation of the two level shifters 35 and 36 so that the nonpolarity converted output of the subtracting circuit 32 and the output of the subtracting circuit 32 converted in polarity by the operational amplifier 41 can be alternately derived from the differentiating circuit 27 to be applied to the recorder 28. The differentiating circuit 27 shown in FIG. 4 is so constructed that, after subtraction of one of the memory contents from the other memory content, the output of the subtracting circuit is alternately converted in polarity by the polarity converting circuit 33. However, this is not an essential condition and any suitable means for providing a constant direction of subtraction may be employed.

At the output of the differentiating circuit 27 having the structure above described, continuous pulses representing the result of the first differentiation of the spectrophotometer output as shown in FIG. 2(b) appear to be recorded on the recorder 28. When the result of differentiation of higher order such as the result of second differentiation is desired, a second differentiating circuit having the same structure as that of the differentiating circuit 27 may be connected to the output of the differentiating circuit 27. In this case, the output of the first differentiating circuit 27 representing the result of the first differentiation is further differentiated and the result of the second differentiation appears at the output of the second differentiating circuit. As described previously, the switch circuit 26 in FIG. 4 has a switching function for directly applying the output of the spectrophotometer 1 without passing such output through the differentiating circuit 27.

Figure 5:
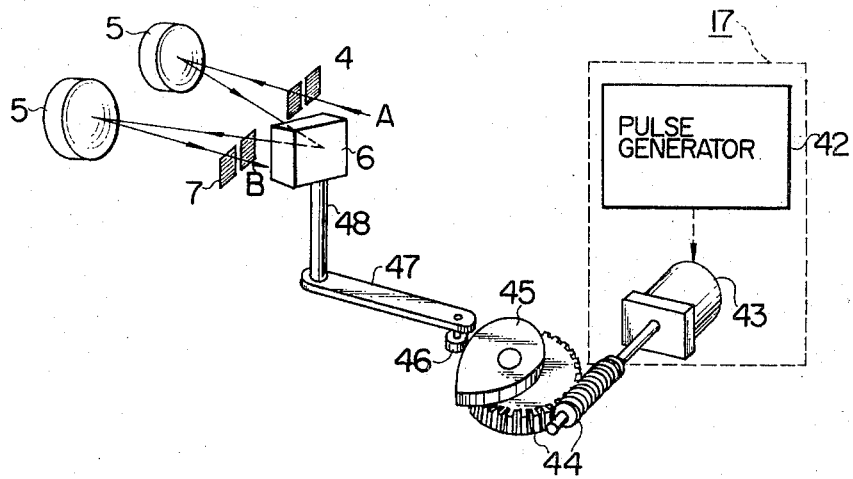
FIG. 5 is a perspective view showing in detail the arrangement of wavelength scanning means in the optical system of the spectrophotometer.

FIG. 5 is a diagrammatic perspective view of a scanning mechanism for the wavelength scanning in the spectrophotometer according to the present invention. The wavelength scanning is generally carried out by rotating the diffraction 6 as described previously. FIG. 5 shows one form in which a pulse motor is used as the diffraction grating device means 17. More precisely, the diffraction grating drive means 17 comprises a pulse generator 42 and a pulse motor 43, and the pulse motor 43 is rotated periodically by a predetermined angle by the pulse signal applied from the pulse generator 42. In response to the rotation of the pulse motor 43, a wavelength cam 45 is rotated at a reduced speed through a reduction gear unit 44, and the rotation of the cam 45 is transmitted to a cam lever 47 through an integral roller 46. The cam lever 47 is pivoted to a supporting rod 48 fixed to the diffraction grating 6. Therefore, the diffraction grating 6 is rotated through a very small angle in synchronism with the rotation of the pulse motor 43. Thus, a light beam A coming from the light source passes through the entrance slit 4 and is then reflected by the collimator mirror 5 and diffraction grating 6 to pass through the exit slit 7 to appear as a scanned light beam B having a single wavelength.

It will be understood that the differentiating circuit in the spectrophotometer of the present invention having the diffraction grating drive means comprises a combination of simple operational amplifiers, flip-flop and other elements well known in the art as shown in FIG. 4. Further, an expensive electronic computer is not used as above described, and the signal representing the absorption spectrum and the signal representing the differentiated spectrum can be selectively obtained by switching over the switching circuit 26.

Figure 6:
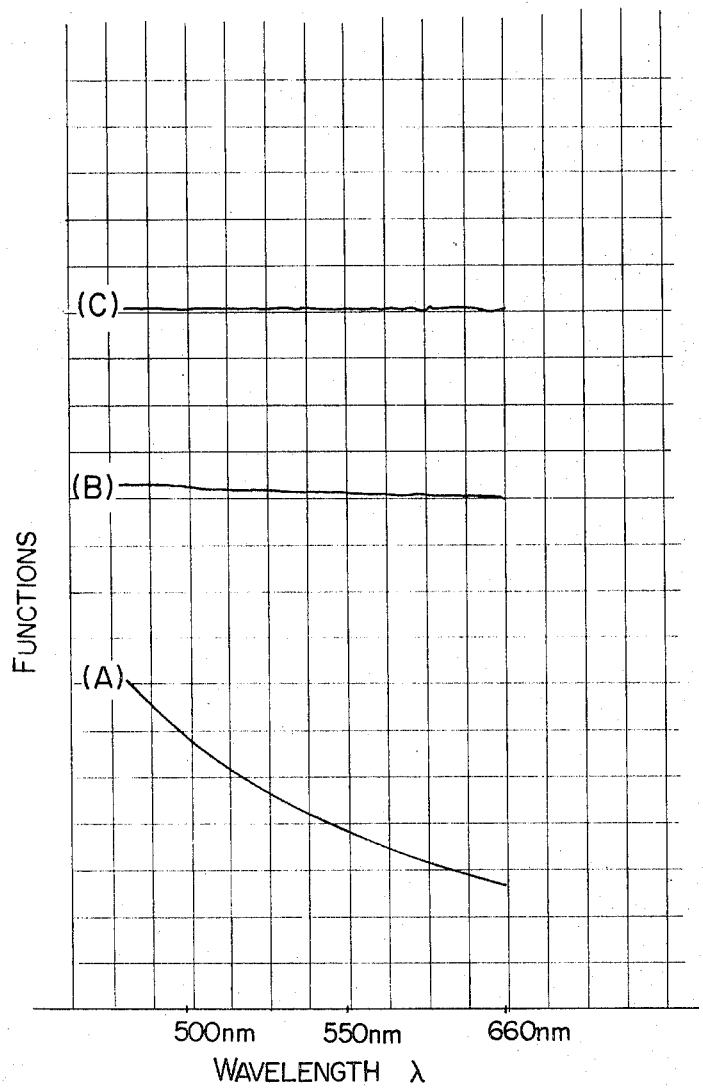
FIG. 6 is a spectral diagram illustrating differentiated spectra of the first and second order.

The principle of measurement of the differentiated spectrum and an embodiment of the spectrophotometer according to the present invention will be understood from the above description. FIGS. 6 and 7 show actual differentiated spectra obtained by the spectrophotometer of the present invention having the differentiating circuit, and the advantages and necessity of measurement of differentiated spectra will be described with reference to FIGS. 6 and 7.

It is generally said that measurement of the differentiated spectrum of the second order is advantageous over measurement of the differentiated spectrum of the first order. The reasons therefor will be described below. When, for example, a portion of an absorption spectrum obtained by a spectrophotometer is expressed by the well-known basic quadratic function $y = ax^2 + bx + c$, the derived function of the first order of the above function can be expressed as $$y' = 2ax = b \qquad (1)$$

and similarly the derived function of the second order can be expressed as $$y'' = 2a \qquad (2)$$

It is apparent from the above equations (1) and (2) that $y'$ in the equation (1) varies with a gradient $2a$ with respect to variations of $x$, while $y''$ in the equation (2) has always a constant value $2a$ regardless of variations of $x$. In other words, when the base line of a measured spectrum including complex peaks varies in a quadratic fashion, the corrugated base line of the differentiated spectrum of the first order inclines with respect to the horizontal, while the corrugated base line of the differentiated spectrum of the second order is substantially parallel to the horizontal. It is apparent from the above fact that measurement of the differentiated spectrum of the second order is advantageous over measurement of the differentiated spectrum of the first order especially when the peak height is quantitatively sought or determined.

In order to verify the above fact, an absorption spectrum of cow's milk is actually obtained as shown by (A) in FIG. 6 to be compared with the differentiated spectrum of the first order shown by (B) and with the differentiated spectrum of the second order shown by (C). It will be apparent from FIG. 6 that the absorption spectrum of cow's milk shown by (A) is in the form of a curve similar to a quadratic function. On the other hand, in the case of the differentiated spectrum of the first order shown by (B), the base line thereof inclines slightly with respect to the horizontal as will be apparent from FIG. 6. In the case of the differentiated spectrum of the second order shown by (C), any substantial inclination of the base line as above described does not appear.

Figure 7A:
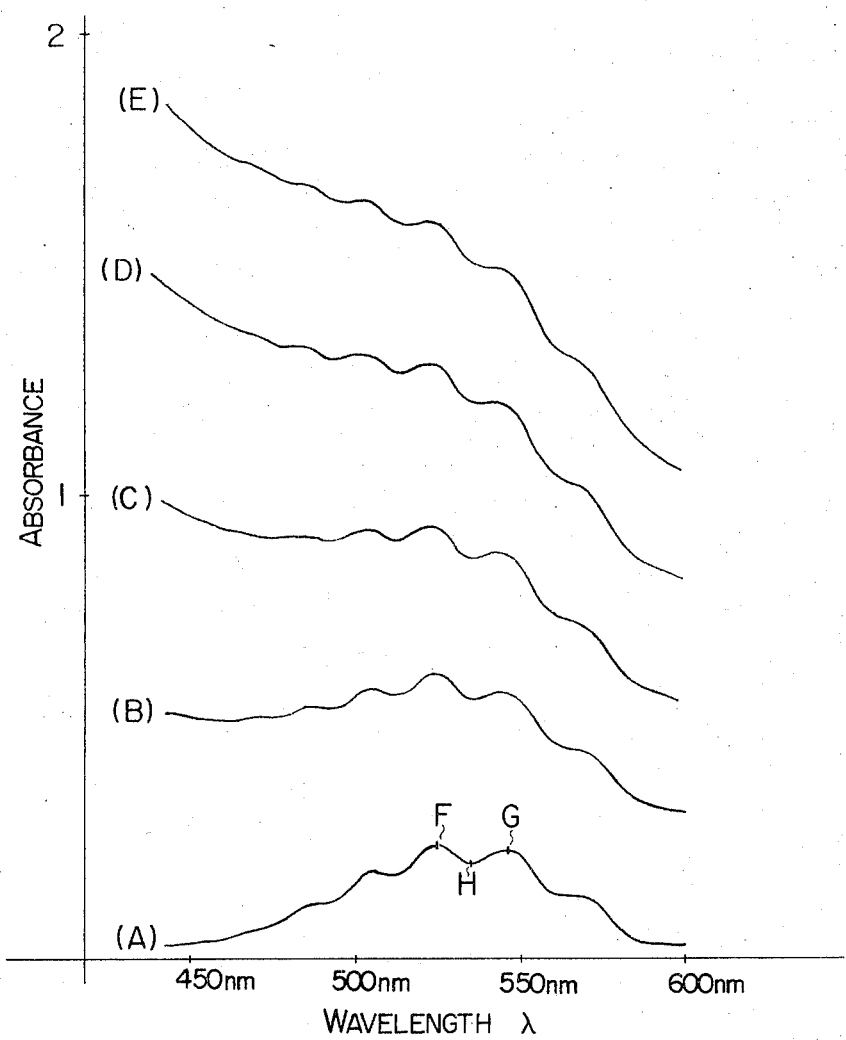
FIG. 7a is a spectral diagram showing spectra obtained when the concentration of a sample solution is varied.
Figure 7B:
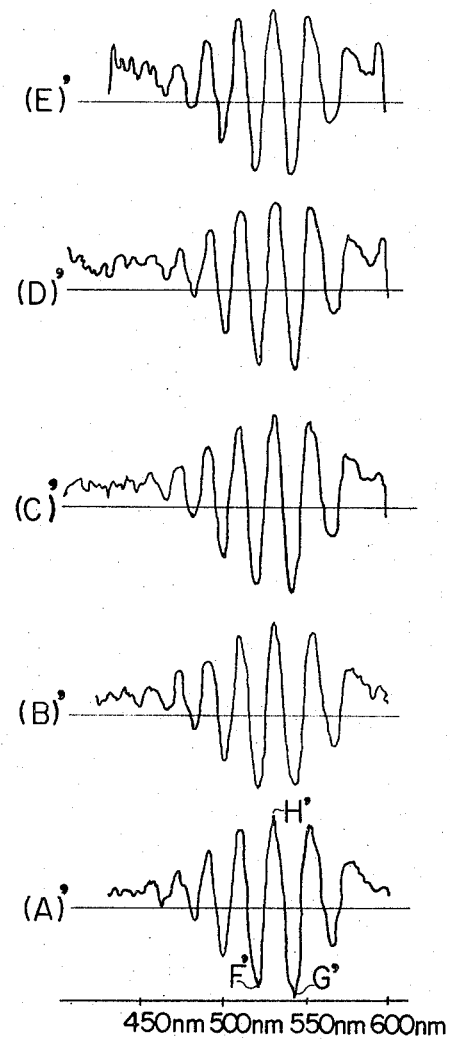

FIG. 6 refers to the case of a simple spectrum. FIG. 7a shows slightly complex spectra in which a plurality of peaks appear in spectra whose base line varies in a quadratic fashion. Actually, FIG. 7a shows absorption spectra of a mixture of cow's milk and potassium permanganate $KMnO_4$). An absorption spectrum of a $KMnO_4$ solution only is shown by (A) in FIG. 7a and spectra obtained by adding cow's milk of successively increasing quantities to this KMnO₄ solution are shown by (B) to (E) in FIG. 7a. It will be apparent from the spectra shown by (B) to (E) in FIG. 7a, the base line is gradually raised with the increase in the quantity of cow's milk added to the KMnO₄ solution and a quadratic change as shown by (A) in FIG. 6 tends to appear in the base line, with the result that it becomes difficult to confirm the peaks and peak values of KMnO₄ contained in cow's milk with the increase in the quantity of cow's milk. Differentiation of these spectra after first differentiation gives differentiated spectra of the second order as shown by (A') to (E') in FIG. 7b corresponding to (A) to (E) in FIG. 7a. It is apparent from FIG. 7b that the spectra shown by (B') to (E') do not substantially vary from the spectrum of KMnO₄ shown by (A') in spite of the addition of cow's milk and the base line of these spectra is always horizontal.

Further, a differentiated spectrum of the second order has an important feature. That is, there is a coincidence between a peak of a peak of a spectrum commonly obtained from a measured signal and a corresponding peak of a differentiated spectrum of the second order. This is apparent from the principle of differentiation of the second order. For example, the positive peak points F and G and the negative peak point H in the spectrum shown by (A) in FIG. 7a correspond respectively to the points F', G' and H' in the differentiated spectrum of the second order shown by (A') in FIG. 7b. Further, the relative positions of these points remain the same even when the peaks become successively broader as seen in (B) to (E) in FIG. 7a, and constant spectra can be always obtained as shown by (B') to (E') in FiG. 7b according to the kind and concentration of component elements contained in the solution subjected to measurement. Further, as is well known, the peak value of the differentiated spectrum of the second order has a fixed relation with the peak value of the measured spectrum. Thus, the peak value can be easily and accurately quantitatively determined from the differentiated spectrum of the second order.

While the advantages of obtaining a differentiated spectrum of the second order in relation to the spectral measurement with the spectrophotometer has been described in the above, the structure of the present invention shown in FIG. 3 or the structure of the differentiating circuit 27 shown in FIG. 4 is adapted merely for obtaining a differentiated spectrum of the first order. However, quantitative determination of the peak value in the differentiated spectrum of the first order can be similarly easily attained as in the case of the differentiated spectrum of the second order. Further, even when determination of the position of peaks is difficult due to appearance of broad peaks in the measured spectrum, such peaks can be relatively easily determined since, in the differentiated spectrum of the first order, the intersections between the spectrum and the base line correspond to the peaks of the measured spectrum. Thus, the differentiated spectrum of the first order is also important in analyzing the measured spectrum.

Another differentiating circuit having a structure entirely the same as that of the diffeentiating circuit 27 shown in FIG. 4 may be connected in series with the differetiating circuit 27 when it is desired to obtain a differentiated spectrum of the second order with the arrangement shown in FIGS. 3 or 4. The differentiated spectrum of the second order can be easily obtained by the second differentiating circuit which differentiates the output of the first differentiating circuit.

Figure 8:
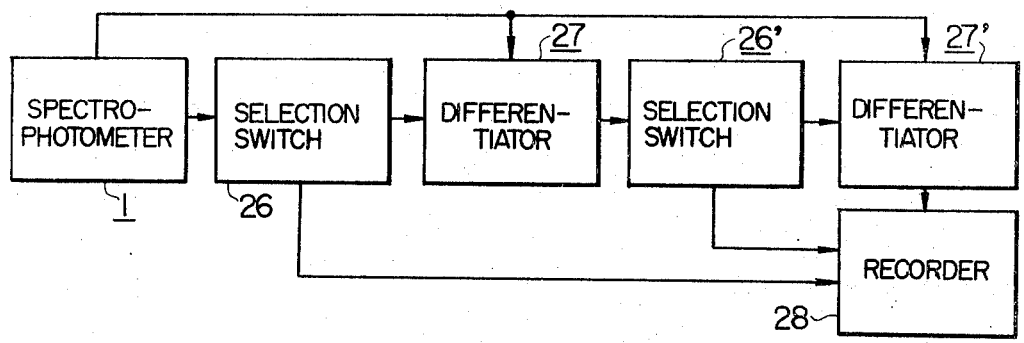
FIGS. 8, 9 and 10 are block diagrams showing the structure of modifications of the present invention.

FIG. 8 shows another embodiment of the present invention which is adapted for obtaining the differentiated spectrum of the second order. Referring to FIG. 8, a spectrophotometer 1, a switching circuit 26 and a differentiating circuit 27 have structures entirely the same as those chosen in FIGS. 3 and 4. The output of the differentiating circuit 27 is applied through another switching circuit 26' to another differentiating circuit 27' for second differentiation and the synchronizing signal is also applied from the spectrophotometer 1 to the second differentiating circuit 27', so that the measured signal output of the spectrophotometer 1 is initially differentiated by the first differentiating circuit 27 and then by the second differentiating circuit 27'. Thus, when the output of the second differentiating circuit 27' is applied to a recorder 28, the differentiated spectrum of the second order can be easily recorded on the recorder 28. The function of the second switching circuit 26' is the same as that of the first switching circuit 26 so that the differentiated spectrum of the second order can be recorded on the recorder 28 or the output of the first differentiating circuit 27 can be directly applied to the recorder 28 for recording the differentiated spectrum of the first order thereon. Those switching circuits 26 and 26' may be of the contactless type.

The above description has referred to an embodiment in which two defferentiating circuits are connected in series for obtaining a differentiated spectrum of the second order. It is apparent that three or four differentiating circuits of the kind above described may be connected in series in order to obtain a differentiated spectrum of the third or fourth order.

Figure 9:
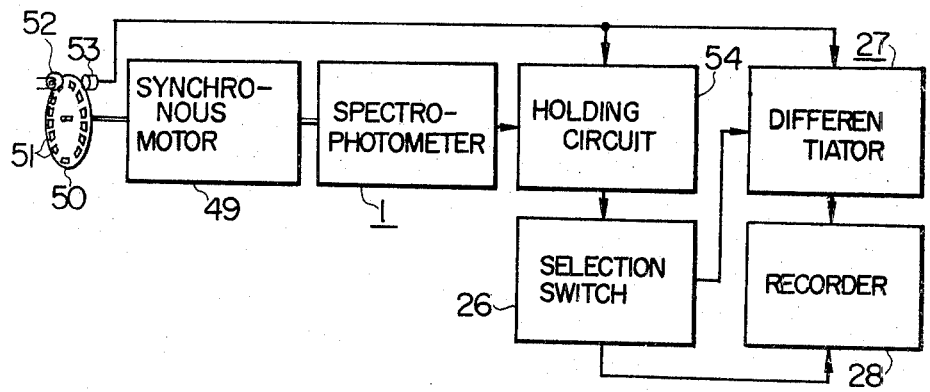

FIG. 9 shows a modification of the present invention in which the spectrophotometer 1 is not provided with the pulse motor 43 shown in FIG. 5 and other means are employed in lieu thereof. Referring to FIG. 9, a synchronous motor 49 is provided for causing rotation of the diffraction grating for the purpose of wavelength scanning. It is needless to say that, in this case, the diffraction grating is connected tO the motor 49 through a reduction gear unit (not shown) so that the diffraction grating can be continuously rotated at a very low speed. The motor 49 is further arranged to cause rotation of a disc 50 at a constant speed and the disc 50 is provided with a plurality of slits 51 spaced from each other by a predetermined distance along the circumference. Light emitted from a lamp 52 passes through the successive slits 51 with the rotation of the disc 50 and is detected by a photoelectric element 53 to provide a pulse-like synchronizing signal. The continuously varying output signal of the spectrophotometer 1 is held in a holding circuit 54 in synchronism with the synchronizing signal and the output of the holding circuit 54 is applied periodically to the differentiating circuit 27 through the switch circuit 26. Due to the fact that the synchronizing signal is applied also to the differentiating circuit 27, differentiating operation similar to that described with reference to FIG. 4 is carried out and the differentiated output of the differentiating circuit 27 is applied to the recorder 28.

Figure 2:
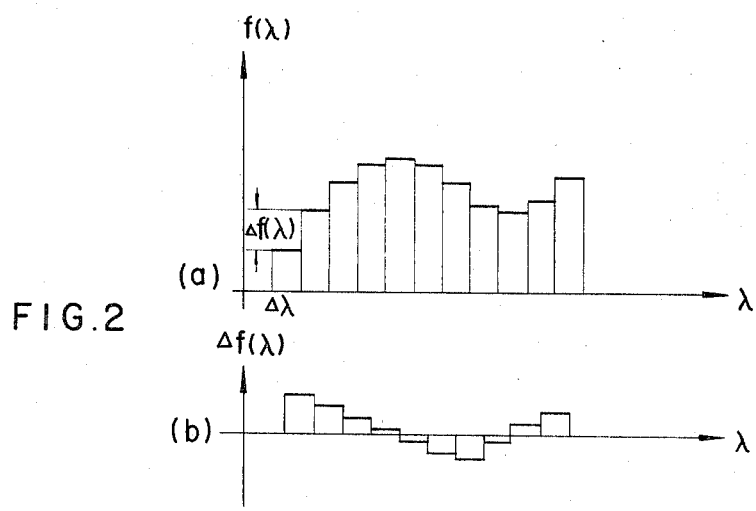
FIG. 2 shows the manner of differentiating the output of a spectrophotometer.

In the present embodiment, the output of the spectrophotometer 1 varies in the form of a continuous function due to the fact that wavelength scanning is continuously carried out by the disc 50 driven by the synchronous motor 49. Therefore, by successively holding the output of the spectrophotometer 1 in synchronism with the output of the photoelectric element 53 and applying the output of the holding circuit 54 to the differentiating circuit 27 with the same timing, the output signal of the holding circuit 54 having a pulsating waveform as shown in FIG. 2 can be easily differentiated by the differentiating circuit 27.

Figure 10:
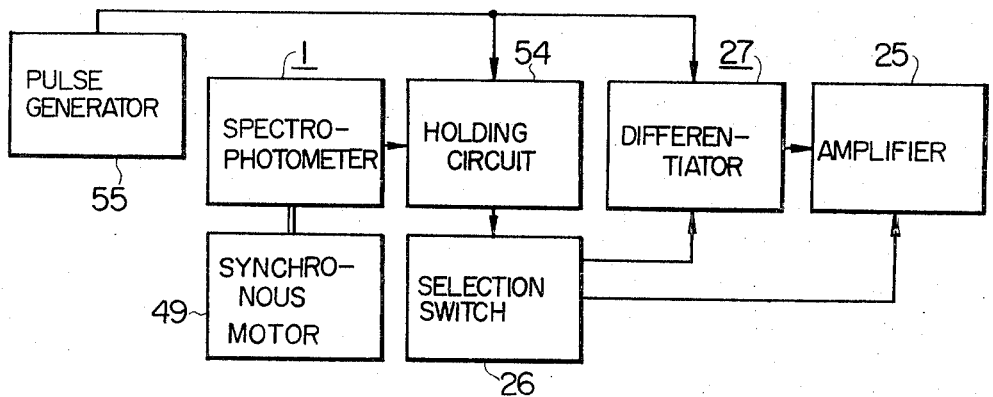

FIG. 10 shows another modification of the present invention, in which another means is provided for obtaining the synchronizing signal. More precisely, an electrical means is used for obtaining the synchronizing signal in FIG. 10 in contrast to FIG. 9 in which the synchronizing signal is obtained by the mechanical and optical means. Referring to FIG. 10, a simple pulse generator 55 similar to the pulse generator 42 shown in FIG. 5 is employed to apply its output to the holding circuit 54 and to the differentiating circuit 27 for attaining the same effect as that described in the modification shown in FIG. 9. Any detailed description of the structure of the modification shown in FIG. 10 is unnecessary since the structure is entirely the same as that shown in FIG. 9 except the synchronizing pulse generating means.

Although the synchronous motor 49, disc 50, lamp 52, photoelectric element 53 and pulse generator 55 are shown disposed externally of the spectrophotometer 1 in FIGS. 9 and 10, these elements may naturally be incorporated in the interior of the spectrophotometer 1. Further, although only one differentiating circuit is illustrated in FIGS. 9 and 10, a plurality of such differentiating circuits may be connected in series when it is desired to obtain a differentiated spectrum of higher order.

It will be understood from the foregoing detailed description of a few embodiments and modifications of the present invention, the present invention employs a differentiating circuit composed of simple elements or a desired number of such differentiating circuits connected in series so as to obtain a differentiated spectrum of the first order or of higher order as desired and to record this differentiated spectrum on a recorder. Further, when a recording device capable of simultaneously recording a plurality of signals is employed, a spectrum representing the light absorption rate or the like and a differentiated spectrum can be simultaneously recorded. Therefore, the comparison between these spectra can be easily attained and a more accurate spectral analysis can be achieved.

We claim:

1. A spectrophotometer comprising light wavelength scanning means including a dispersing element for dispersing light emitted from a light source and drive means for causing rotation of said dispersing element, means for directing the light coming from said light wavelength scanning means toward a sample solution, means for detecting light passed through said sample solution thereby obtaining a corresponding detected output signal, means for delivering said detected output signal in synchronism with the output of a pulse generator, means for distributing alternately said delivered output signal in synchronism with the output of said pulse generator, a pair of memory means for storing alternately said distributed output signal, and means for subtracting the memory content of one of said memory means from that of the other said memory means.

2. An apparatus as claimed in claim 1, wherein said drive means includes a pulse motor which is driven by said pulse generator.

3. An apparatus as claimed in claim 1, wherein said drive means includes a synchronous motor.

4. An apparatus as claimed in claim 1, wherein a switching means is connected between said detecting means and said distributing means.

5. An apparatus as claimed in claim 3, comprising means including a rotary member for converting continuous light emitted from the light source into intermittent light, means for detecting said intermittent light, and means for detecting the light passed through said sample solution in synchronism with said detected intermittent signal so as to obtain a corresponding detected output signal.

6. An apparatus as claimed in claim 1, comprising polarity converting means for converting the polarity of alternate ones of the result of subtraction by said subtracting means.

7. An apparatus as claimed in claim 5, comprising polarity converting means for converting the polarity of alternate ones of the result of subtraction by said subtracting means.

8. A spectrophotometer comprising light wavelength scanning means including a dispersing element for dispersing light emitted from a light source and drive means for causing rotation of said dispersing element, means for directing the light coming from said light wavelength scanning means toward a sample solution, means for detecting the light passed through said sample solution thereby obtaining a corresponding detected output signal, and means including a plurality of differentiating means connected in series, each said differentiating means including means for delivering said detected output signal in synchronism with the output of a pulse generator, means for distributing alternately said delivered output signal in synchronism with the output of said pulse generator, a pair of memory means for storing alternately said distributed output signal, and means for subtracting the memory content of one of said memory means from that of the other said memory means.

9. An apparatus as claimed in claim 8, wherein a switching means is connected to the input of each said differentiating means.

10. An apparatus as claimed in claim 8, comprising polarity converting means for converting the polarity of alternate ones of the result of subtraction by said subtracting means.

* * * * *